(12) United States Patent
Rodenbeck et al.

(10) Patent No.: US 8,104,113 B2
(45) Date of Patent: Jan. 31, 2012

(54) POSITION-SENSING DETECTOR ARRANGEMENT FOR CONTROLLING A FAUCET

(75) Inventors: Robert Wilmer Rodenbeck, Indianapolis, IN (US); Spencer Lee Stohler, Anderson, IN (US); David M. Burke, Taylor, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 1464 days.

(21) Appl. No.: 11/326,989

(22) Filed: Jan. 5, 2006

(65) Prior Publication Data

US 2006/0200903 A1   Sep. 14, 2006

Related U.S. Application Data

(60) Provisional application No. 60/661,982, filed on Mar. 14, 2005.

(51) Int. Cl.
   *E03C 1/05* (2006.01)
(52) U.S. Cl. ........................................ 4/623; 251/129.03
(58) Field of Classification Search .. 4/623; 251/129.03
   See application file for complete search history.

(56) References Cited

U.S. PATENT DOCUMENTS

| | | |
|---|---|---|
| 4,688,277 A | 8/1987 | Kakinoki et al. |
| 4,709,728 A | 12/1987 | Ying-Chung |
| 4,823,414 A | 4/1989 | Piersimoni et al. |
| 4,826,129 A | 5/1989 | Fong et al. |
| 4,869,287 A | 9/1989 | Pepper et al. |
| 4,948,090 A | 8/1990 | Chen |
| 4,953,236 A * | 9/1990 | Lee et al. ........................... 4/623 |
| 4,998,673 A | 3/1991 | Pilolla |
| 5,025,516 A | 6/1991 | Wilson |
| 5,073,991 A | 12/1991 | Marty |
| 5,074,520 A | 12/1991 | Lee et al. |
| 5,224,509 A | 7/1993 | Tanaka et al. |
| 5,243,717 A | 9/1993 | Yasuo |
| 5,549,273 A | 8/1996 | Aharon |
| 5,555,912 A | 9/1996 | Saadi et al. |
| 5,566,702 A | 10/1996 | Philipp |
| 5,570,869 A | 11/1996 | Diaz et al. |
| 5,758,688 A | 6/1998 | Hamanaka et al. |
| 5,781,942 A | 7/1998 | Allen et al. |
| 5,855,356 A * | 1/1999 | Fait ................................... 4/623 |

(Continued)

FOREIGN PATENT DOCUMENTS

DE           3339849           5/1985

(Continued)

OTHER PUBLICATIONS

Snow, Laser Triangulation Sensors in the Tire Industry, LMI Selcom, undated (5 pgs.).

(Continued)

*Primary Examiner* — Tuan Nguyen
(74) *Attorney, Agent, or Firm* — Faegre Baker Daniels LLP

(57) ABSTRACT

A faucet arrangement includes a sensing device for sensing a presence of a user of a spout. The sensing device includes an infrared emitter installed such that a direction of emission of the emitter is oriented an angle of approximately between 5 and 15 degrees relative to a vertical direction. A receiver receives a diffused infrared energy from the emitter. A control device is in communication with the receiver and controls a flow of liquid through the spout dependent upon an angle at which the diffused infrared energy is received by the receiver.

22 Claims, 16 Drawing Sheets

U.S. PATENT DOCUMENTS

| | | | |
|---|---|---|---|
| 5,918,855 | A | 7/1999 | Hamanaka et al. |
| 5,934,325 | A | 8/1999 | Brattoli et al. |
| 5,966,753 | A | 10/1999 | Gauthier et al. |
| 5,979,500 | A | 11/1999 | Jahrling et al. |
| 6,003,170 | A | 12/1999 | Humpert et al. |
| 6,082,407 | A | 7/2000 | Paterson et al. |
| 6,125,482 | A * | 10/2000 | Foster ............................ 4/623 |
| 6,127,671 | A | 10/2000 | Parsons et al. |
| 6,135,146 | A | 10/2000 | Koganezawa et al. |
| 6,161,814 | A | 12/2000 | Jahrling |
| 6,192,530 | B1 | 2/2001 | Dai |
| 6,202,980 | B1 | 3/2001 | Vincent et al. |
| 6,220,297 | B1 | 4/2001 | Marty et al. |
| 6,273,394 | B1 | 8/2001 | Vincent et al. |
| 6,294,786 | B1 | 9/2001 | Marcichow et al. |
| 6,321,785 | B1 * | 11/2001 | Bergmann .................... 4/623 |
| 6,363,549 | B2 | 4/2002 | Humpert et al. |
| 6,381,770 | B1 | 5/2002 | Raisch |
| 6,393,634 | B1 | 5/2002 | Kodaira et al. |
| RE37,888 | E | 10/2002 | Cretu-Petra |
| 6,513,787 | B1 | 2/2003 | Jeromson et al. |
| 6,588,453 | B2 | 7/2003 | Marty et al. |
| 6,639,209 | B1 | 10/2003 | Patterson et al. |
| 6,691,340 | B2 | 2/2004 | Honda et al. |
| 6,710,346 | B2 | 3/2004 | Brewington et al. |
| 6,738,996 | B1 | 5/2004 | Malek et al. |
| 6,757,921 | B2 | 7/2004 | Esche |
| 6,768,103 | B2 | 7/2004 | Watson |
| 6,770,869 | B2 | 8/2004 | Patterson et al. |
| 6,845,526 | B2 | 1/2005 | Malek et al. |
| 6,877,172 | B2 | 4/2005 | Malek et al. |
| 6,894,270 | B2 | 5/2005 | Bailey |
| 6,956,498 | B1 | 10/2005 | Gauthier et al. |
| 6,962,168 | B2 | 11/2005 | McDaniel et al. |
| 6,964,404 | B2 | 11/2005 | Patterson et al. |
| 6,968,860 | B1 | 11/2005 | Haenlein et al. |
| 6,985,239 | B2 | 1/2006 | Doucet et al. |
| 6,996,863 | B2 | 2/2006 | Kaneko |
| 7,150,293 | B2 | 12/2006 | Jonte |
| 7,232,111 | B2 * | 6/2007 | McDaniel et al. ............ 4/623 |
| 7,278,624 | B2 | 10/2007 | Iott et al. |
| 7,472,433 | B2 | 1/2009 | Rodenbeck et al. |
| 7,516,939 | B2 | 4/2009 | Bailey |
| 7,537,023 | B2 | 5/2009 | Marty et al. |
| 7,537,195 | B2 | 5/2009 | McDaniel et al. |
| 7,614,096 | B2 | 11/2009 | Vincent |
| 7,625,667 | B2 | 12/2009 | Marty et al. |
| 7,690,395 | B2 | 4/2010 | Jonte et al. |
| 2004/0084609 | A1 | 5/2004 | Bailey |
| 2004/0104340 | A1 | 6/2004 | Watson |
| 2004/0135010 | A1 | 7/2004 | Malek et al. |
| 2004/0144866 | A1 | 7/2004 | Nelson et al. |
| 2005/0127313 | A1 | 6/2005 | Watson |
| 2005/0150556 | A1 | 7/2005 | Jonte |
| 2005/0151101 | A1 | 7/2005 | McDaniel et al. |
| 2006/0130907 | A1 | 6/2006 | Marty et al. |
| 2006/0200903 | A1 | 9/2006 | Rodenbeck et al. |
| 2006/0207019 | A1 | 9/2006 | Vincent |
| 2007/0069168 | A1 | 3/2007 | Jonte |
| 2010/0096017 | A1 | 4/2010 | Jonte et al. |

FOREIGN PATENT DOCUMENTS

| | | |
|---|---|---|
| EP | 0 409 998 B1 | 11/1995 |
| EP | 1 132 530 A2 | 9/2001 |
| EP | 0 685 604 B1 | 3/2003 |
| GB | 2 264 557 | 9/1993 |
| WO | WO 91/17377 | 11/1991 |
| WO | WO 99/61938 | 12/1999 |

OTHER PUBLICATIONS

Grimmett, Flexible Application-Oriented Photoelectric Sensors: The Latest Technologies and Implementation, Omron Electronics LLC, Sep. 1, 2002 (2 pgs.).

Kennedy, The Basics of Triangulation Sensors, CyberOptics Corp., undated (7 pgs.).

Sharp Corporation, Device Specification for 8 bit output distance measuring sensor, Model GP3Y0E001k0F. Spec. No. ED-04-G112, Issue Oct. 16, 2004 (10 pgs.).

TOTO® Products, "Self-Generating EcoPower System Sensor Faucet, Standard Spout," Specification Sheet, Nov. 2002, 2 pgs.

ZURN® Plumbing Products Group, "AquaSense® Z6903 Series", Installation, Operation, Maintenance and Parts Manual, Aug. 2001, 5 pgs.

ZURN® Plumbing Products Group, "AquaSense® Sensor Faucet," Jun. 9, 2004, 2 pgs.

SLOAN® Optima® i.q. Electronic Hand Washing Faucet, Apr. 2004, 2 pgs.

Symmons®, "Ultra-Sense® Battery-Powered, Sensor-Operated Lavatory Faucet S-6080 Series," Oct. 2002, 4 pgs.

Symmons® Commercial Faucets: Reliability With a Sense of Style, 1 pg.

Symmons®, "Ultra-Sense® Sensor Faucets with Position-Sensitive Detection," Aug. 2004, 4 pgs.

Symmons®, "Ultra-Sense® Sensor Faucet with Position-Sensitive Detection," ©2001-2002, 2 pgs.

Technical Concepts International, Inc., Capri AutoFaucet® with Surround Sensor™ Technology, 500556, 500576, 500577, (undated), 1 pg.

Technical Concepts, AutoFaucet® with "Surround Sensor" Technology, Oct. 2005, 4 pgs.

* cited by examiner

POSITION-SENSING DETECTOR ARRANGEMENT FOR CONTROLLING A FAUCET

CROSS-REFERENCE TO RELATED APPLICATIONS

This application claims the benefit of U.S. Provisional Application No. 60/661,982, filed Mar. 14, 2005, which is expressly incorporated by reference herein.

This application also expressly incorporates by reference the disclosure of each of the following applications: (1) U.S. patent application Ser. No. 10/755,581, filed Jan. 12, 2004, titled "MULTI-MODE HANDS FREE AUTOMATIC FAUCET," (2) U.S. patent application Ser. No. 10/755,582, filed Jan. 12, 2004, titled "CONTROL ARRANGEMENT FOR AN AUTOMATIC RESIDENTIAL FAUCET," (3) U.S. patent application Ser. No. 10,757,316, filed Jan. 14, 2004, now U.S. Pat. No. 6,962,168, titled "CAPACITIVE TOUCH ON/OFF CONTROL FOR AN AUTOMATIC RESIDENTIAL FAUCET," (4) U.S. patent application Ser. No. 10/912, 254, filed Aug. 5, 2004, now U.S. Pat. No. 6,968,860, titled "RESTRICTED FLOW HANDS-FREE FAUCET," (5) U.S. Provisional Application No. 60/661,981, filed Mar. 14, 2005, titled "BATTERY BOX ASSEMBLY," (6) U.S. Provisional Patent Application Ser. No. 60/662,107, filed Mar. 14, 2005, titled "SPOUT ASSEMBLY FOR AN ELECTRONIC FAUCET AND METHOD FOR PROVIDING STRAIN RELIEF OF A CABLE," and (7) U.S. Provisional Patent Application Ser. No. 60/662,106, filed Mar. 14, 2005, titled "VALVE BODY ASSEMBLY WITH ELECTRONIC SWITCHING" ("Related Applications"). It is understood that certain features disclosed and/or claimed in one or more of the Related Applications may be combined and/or claimed in combination with certain features disclosed in this application.

BACKGROUND OF THE INVENTION

1. Field of the Invention

The present invention relates to faucets, and, more particularly, to electronic activation systems for faucets.

2. Description of the Related Art

The state of the art in electronic activation of plumbing faucets utilizes infrared (IR) sensors to determine whether a user is placing his hands or some object such as dishes under the spout. The sensor is typically directed to the general area under the spout. If the sensor determines that the user is placing his hands or some object under the faucet, then a controller turns on a flow of water or some other liquid to the spout. When the IR sensor no longer senses the presence of the hand or object under the spout, then the controller turns off the flow of liquid to the spout.

IR sensors typically include an emitter for emitting IR energy, and a receiver for receiving the IR energy after it has been reflected by some object in the path of the emitted IR energy. Known IR sensors for electronically activating faucets are intensity-based in that the sensors detect the presence of a hand or object under the spout based upon an intensity, magnitude or strength of the reflected IR energy received by the receiver. Generally, the greater the intensity of the reflected energy, the more likely it is that a hand or object has been placed under the spout.

A problem with intensity-based IR sensors is that they cannot easily discriminate between various types of scenarios that may occur in the proximity of a sink. For example, intensity-based IR sensors cannot easily discriminate between a hand entering the sink bowl, the water stream, the water stream with hands actively washing in the stream, and static situations such as a pot placed in the sink bowl. Because of this inability to discriminate, the water stream is not always turned on or off when appropriate.

What is needed in the art is a sensor system that can more easily discriminate between different types of static and dynamic situations in the vicinity of a sink so that the flow of water through the spout may be more accurately controlled.

SUMMARY OF THE INVENTION

The present invention provides a faucet arrangement including an IR sensor that detects the distance between the sensor and objects placed in the vicinity of the sink bowl. Thus, the IR sensor may detect not only the presence of hands or objects under the spout, but may also monitor the movement of such hands or objects. The position-sensitive IR sensor thereby provides data that is more useful than the data that can be provided by an intensity-based IR sensor. The better data provided by the position-sensitive IR sensor enables the controller to make better decisions on whether the flow of liquid through the spout should be turned on or off.

The invention further provides an arrangement of the position-sensitive IR sensor that improves the stability of an output signal that is provided by the sensor's receiver, wherein the output signal is based upon the reflected IR energy received by the receiver. A controller may process or filter the output signal of the sensor receiver in different ways based upon the stability of the output signal. Depending upon the stability of the receiver's output signal, the controller may also use different criteria or threshold values in deciding whether the liquid flow to the spout should be turned on or off.

The invention comprises, in one form thereof, a faucet arrangement including a sensing device for sensing a presence of a user of a spout. The sensing device includes an infrared emitter installed such that a direction of emission of the emitter is oriented an angle of approximately between 5 and 15 degrees relative to a vertical direction. A receiver receives a diffused infrared energy from the emitter. A control device is in communication with the receiver and controls a flow of liquid through the spout dependent upon an angle at which the diffused infrared energy is received by the receiver.

In another form, the invention comprises a faucet arrangement including an infrared sensing device for emitting infrared energy, receiving the infrared energy after the energy has been reflected, determining a distance traveled by the infrared energy before being reflected, and producing a distance signal indicative of the determined distance at a plurality of points in time. A control device is in communication with the sensing device and controls a flow of liquid through a spout dependent upon whether the distance signal exceeds a threshold distance value. The threshold distance value is dependent upon an environmental condition.

In yet another form, the invention comprises a faucet arrangement including an infrared sensing device emitting infrared energy, receiving the infrared energy after the energy has been reflected, determining a distance traveled by the infrared energy before being reflected, and producing a distance signal indicative of the determined distance at a plurality of points in time. A control device is in communication with the sensing device and filters the distance signal dependent upon an environmental condition. The control device also controls a flow of liquid through the spout dependent upon whether the filtered distance signal exceeds a threshold distance value.

An advantage of the present invention is that the position-sensitive IR sensor enables a controller to discriminate between various static and dynamic scenarios that may occur within the vicinity of a sink.

Another advantage is that the stability of the output signal of the sensor receiver is improved.

Yet another advantage is that the output signal of the sensor receiver may be processed or filtered in different ways based upon the stability of the output signal, thus enabling valve control decisions to be made quickly and accurately under various conditions.

A further advantage is that, depending upon the stability of the receiver's output signal, different criteria or threshold values may be used in deciding whether the liquid flow to the spout should be turned on or off, thus enabling valve control decisions to be made accurately under various conditions.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3b is a side view of the tube assembly of FIG. 3a;

FIG. 3c is an exploded perspective view of the tube assembly of FIG. 3a;

Figure 1:
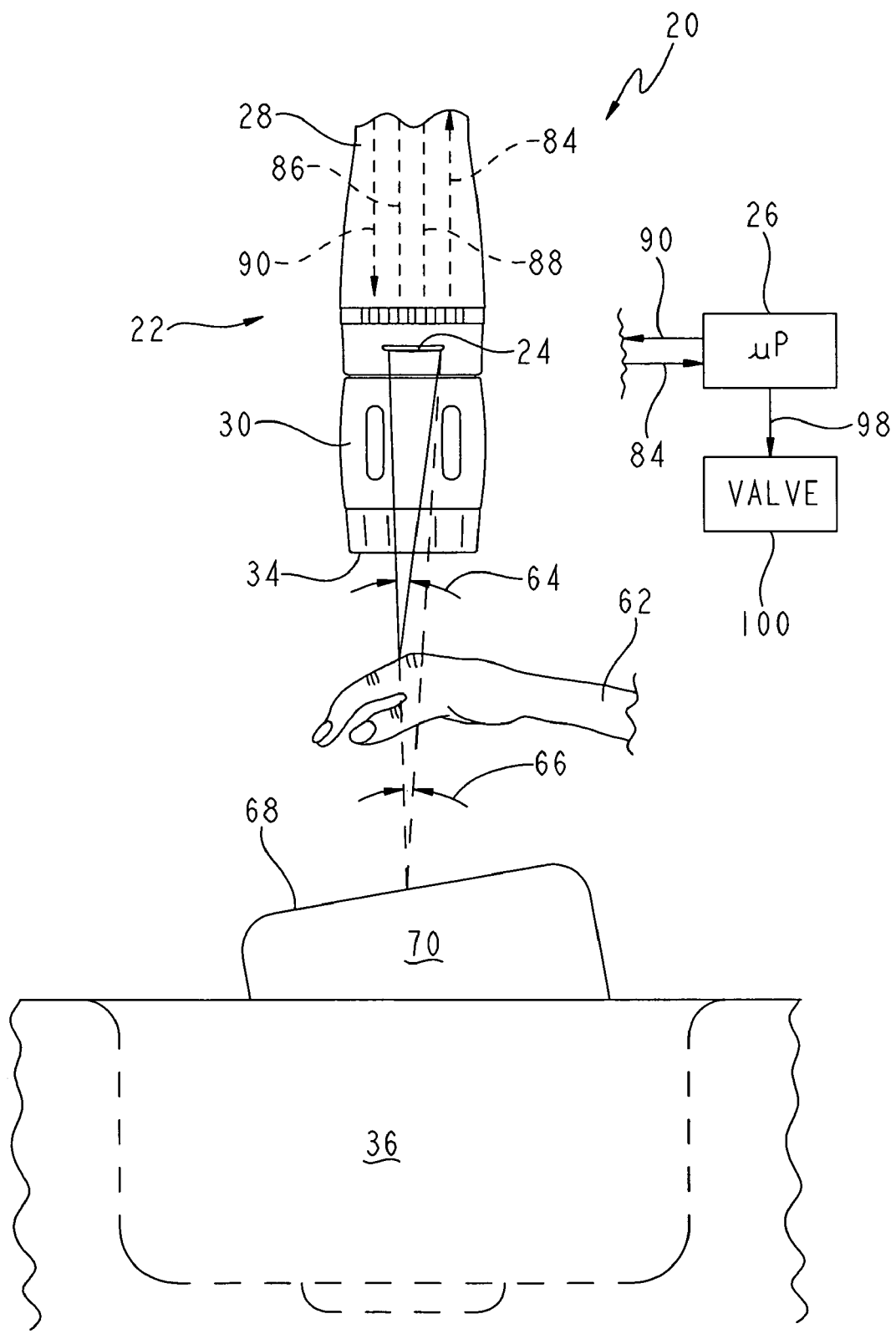
FIG. 1 is a front view of one embodiment of a faucet arrangement of the present invention.

Corresponding reference characters indicate corresponding parts throughout the several views. Although the exemplifications set out herein illustrate the invention, in one form, the embodiments disclosed below are not intended to be exhaustive or to be construed as limiting the scope of the invention to the precise form disclosed.

DESCRIPTION OF THE PRESENT INVENTION

Figure 2:
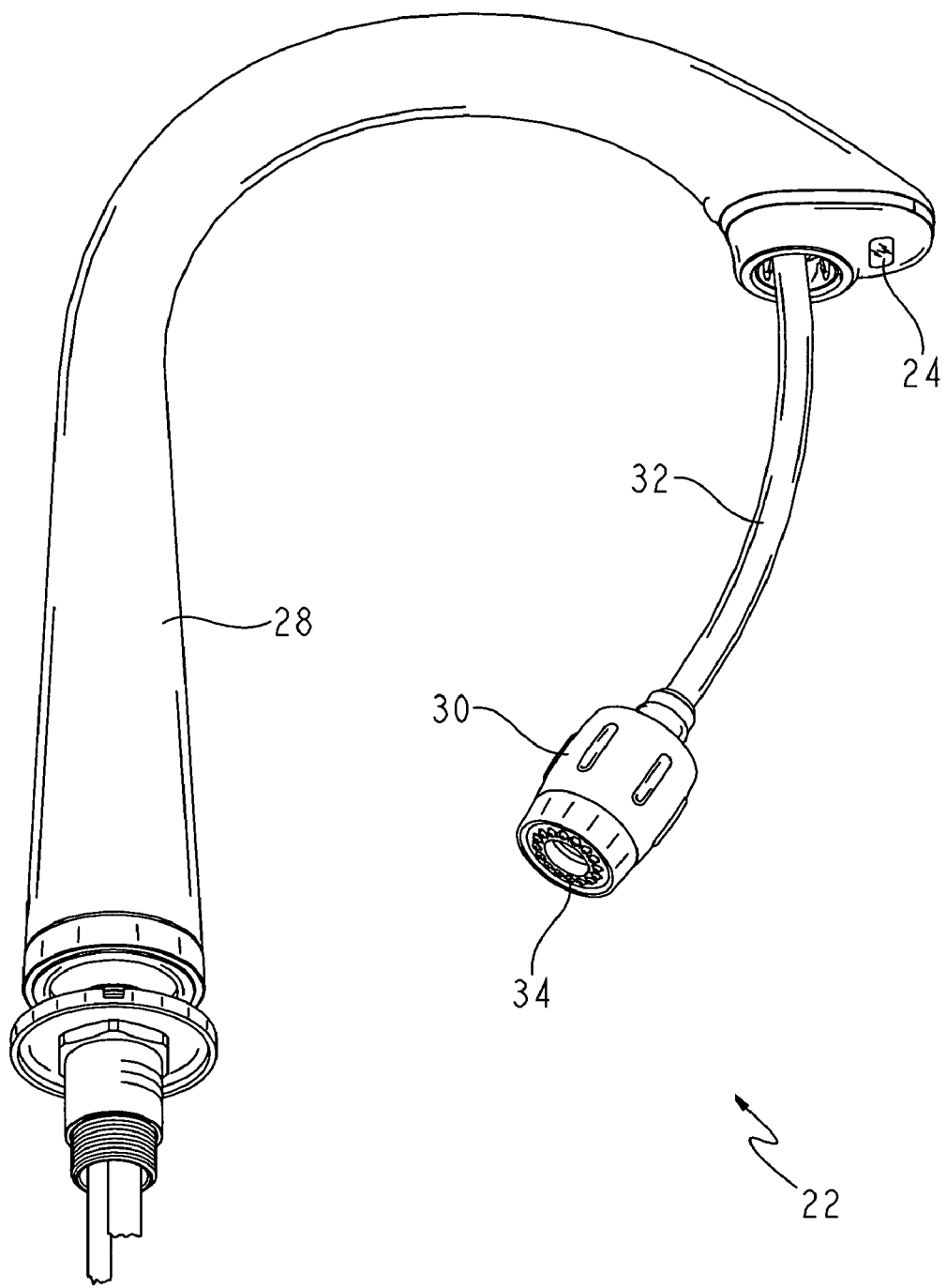
FIG. 2 is a perspective view of the spout of FIG. 1 with the spray head detached from the tube assembly.
Figure 3B:
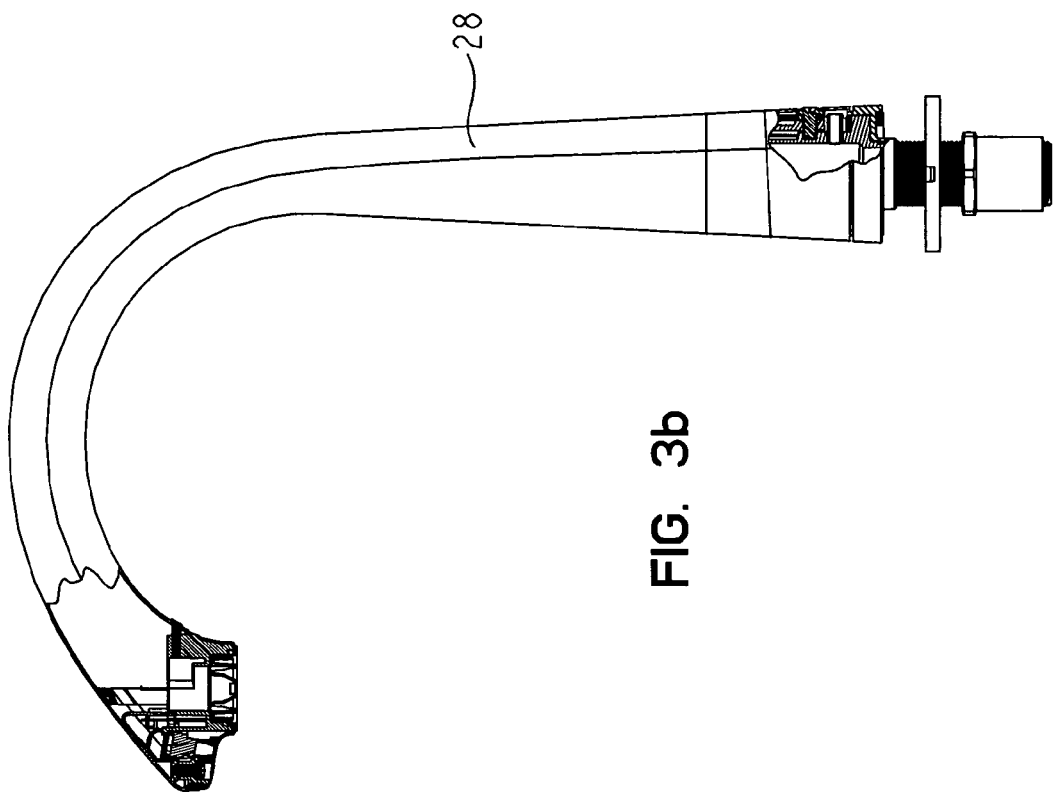
Figure 3A:
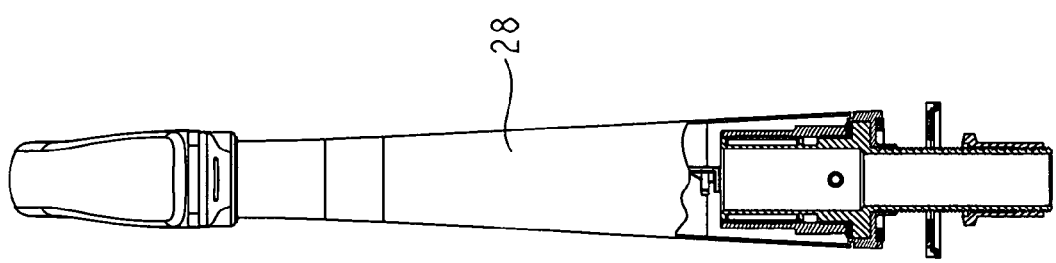
FIG. 3a is a front view of the tube assembly of FIG. 2 with the spray head removed.
Figure 3C:
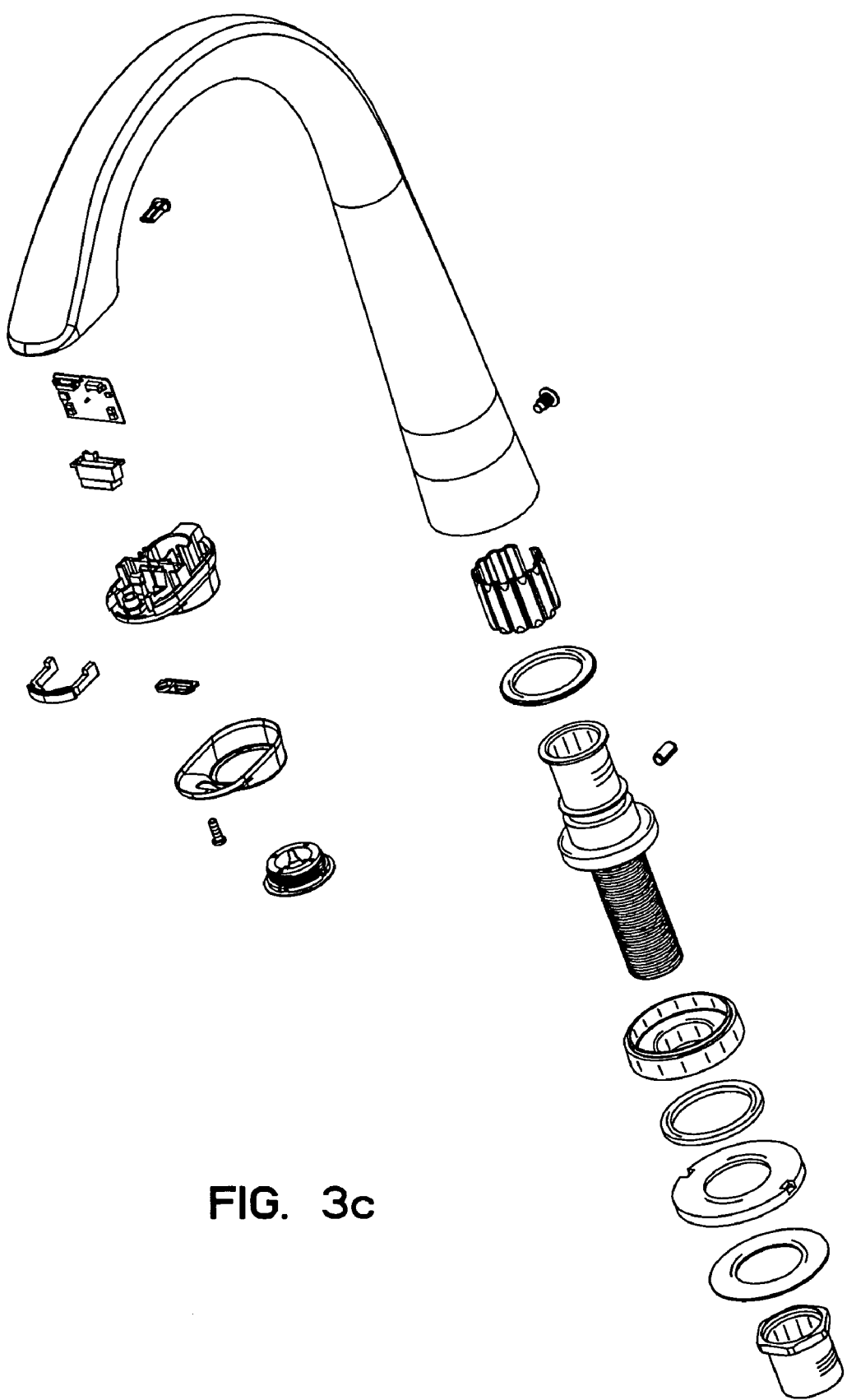

Referring now to the drawings, and particularly to FIG. 1, there is shown one embodiment of a faucet arrangement 20 of the present invention including a spout 22, a sensing device 24, and a control device 26. Spout 22 includes a tube assembly 28 and spray head 30 which may have a diverter. Spray head 30 may be detachable from tube assembly 28, as shown in FIG. 2. Spray head 30 is connected to a water line 32 that extends through tube assembly 28. Spout 22 may deliver a flow of liquid, such as water, through an opening 34 and into a sink bowl 36 disposed below spray head 30, as is well known. Details of tube assembly 28 are shown in FIGS. 3a, 3b and 3c.

As shown in the drawings, sensing device 24 may be positioned on a side of spout 22 that is closer to the user when the user is using faucet arrangement 20. Sensing device 24 may be in the form of an infrared (IR) sensor that is capable of sensing a distance that IR energy emitted by sensor 24 travels before being reflected by some object in its path. That is, sensor 24 may determine a distance between sensor 24 and an object that is reflecting IR energy emitted by sensor 24. In one embodiment, sensor 24 is in the form of a position-sensing detector (PSD). The terms "reflect" and "reflection", as used herein, may refer to either specular reflection, i.e., direct reflection, or diffuse reflection. However, in one embodiment, sensor 24 may sense the distance between sensor 24 and an object primarily or exclusively based upon the diffuse reflection provided by the object.

Figure 4:
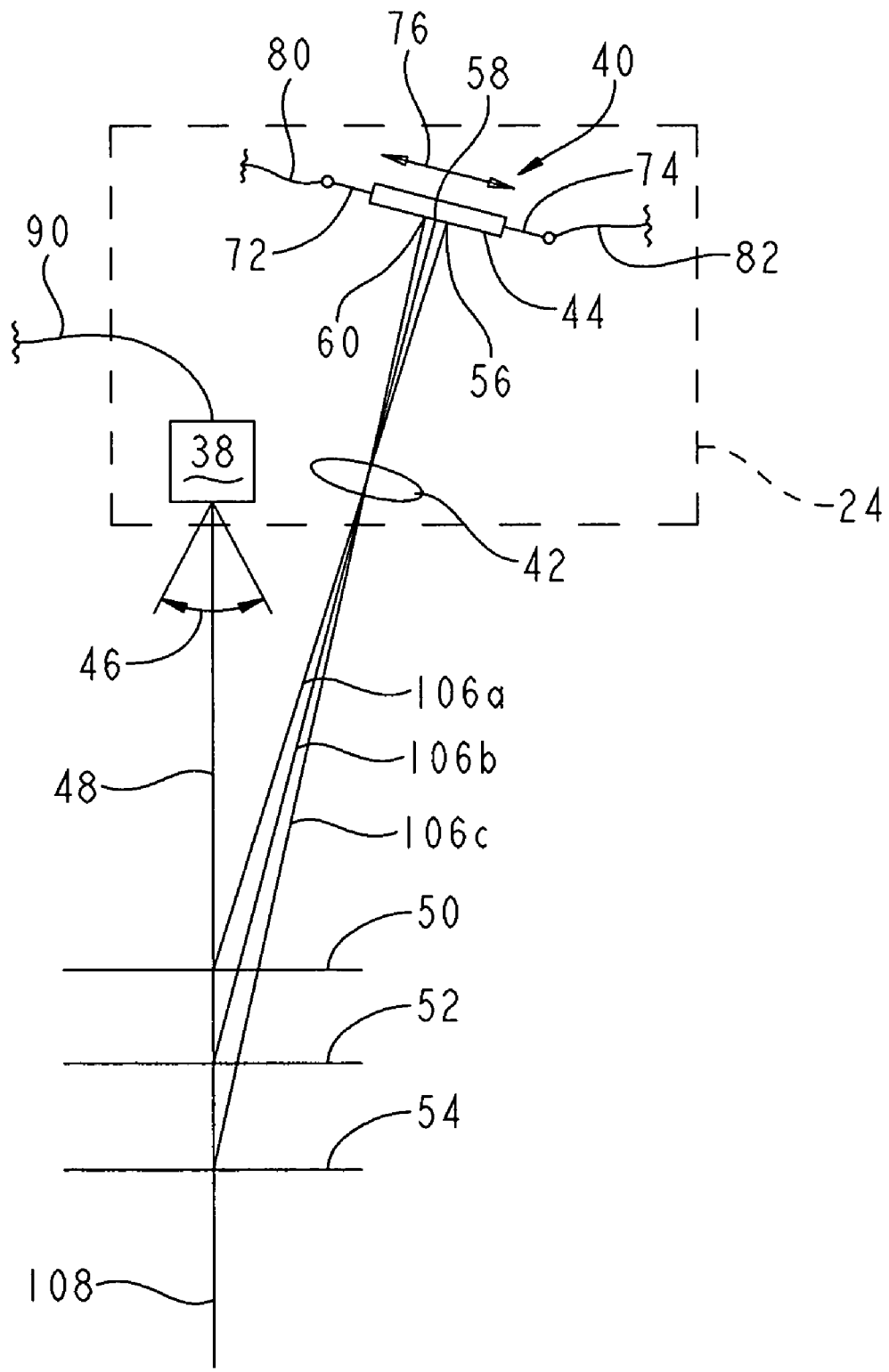
FIG. 4 is an optical schematic diagram of the sensor of FIG. 1.

PSD 24 includes an IR energy emitter 38 (FIG. 4) and an analog IR energy receiver 40 having a lens 42 and a detector 44. Emitter 38 may produce a cone-shaped emission of IR energy spanning a cone angle 46 of approximately 60 degrees. However, the IR energy may be concentrated along a central cone axis 48 such that the effects of the IR energy that is not along axis 48 are relatively small. Generally, the intensity of the IR emission may decrease as the IR energy is directed farther away from axis 48. Depending upon the vertical level of a reflecting surface, i.e., the distance between PSD 24 and the reflecting surface, lens 42 focuses the diffusely reflected IR energy at different locations on IR detector 44. Thus, PSD 24 may determine the vertical level of the reflecting surface based upon the location on detector 44 at which the IR energy is received. For example, different vertical levels 50, 52, 54 of reflecting surfaces would result in the reflected IR energy being focused at different, respective locations 56, 58, 60 on detector 44. As shown in FIG. 1, sensor 24 receives IR energy diffusely reflected from a user's hand 62 at an angle 64 that is larger than an angle 66 at which sensor 24 would receive IR energy diffusely reflected from another object, such as a cooking surface 68 of a pot 70 that is farther away from sensor 24 than is hand 62.

Figure 5:
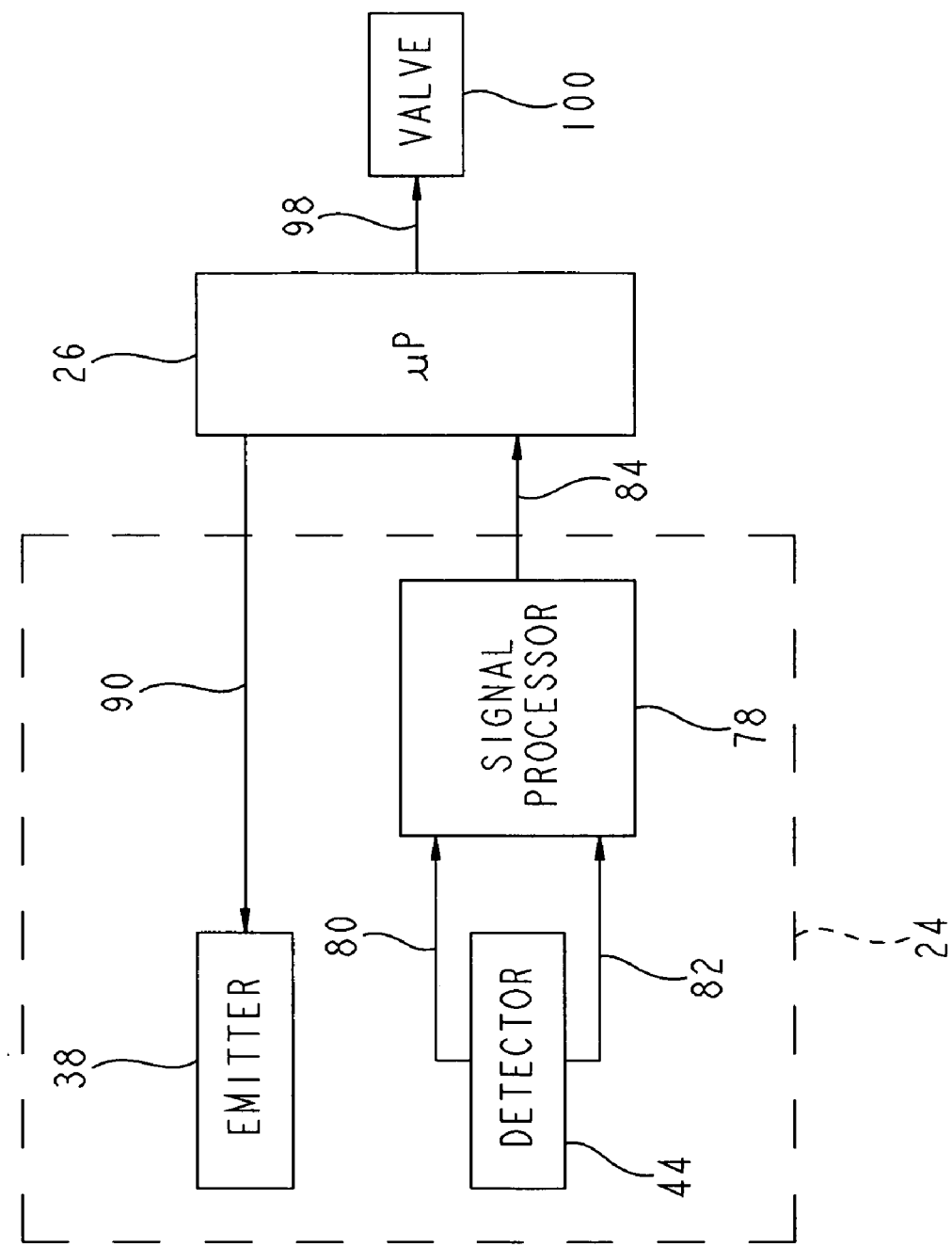
FIG. 5 is an electrical block diagram of the faucet arrangement of FIG. 1.
Figure 6:
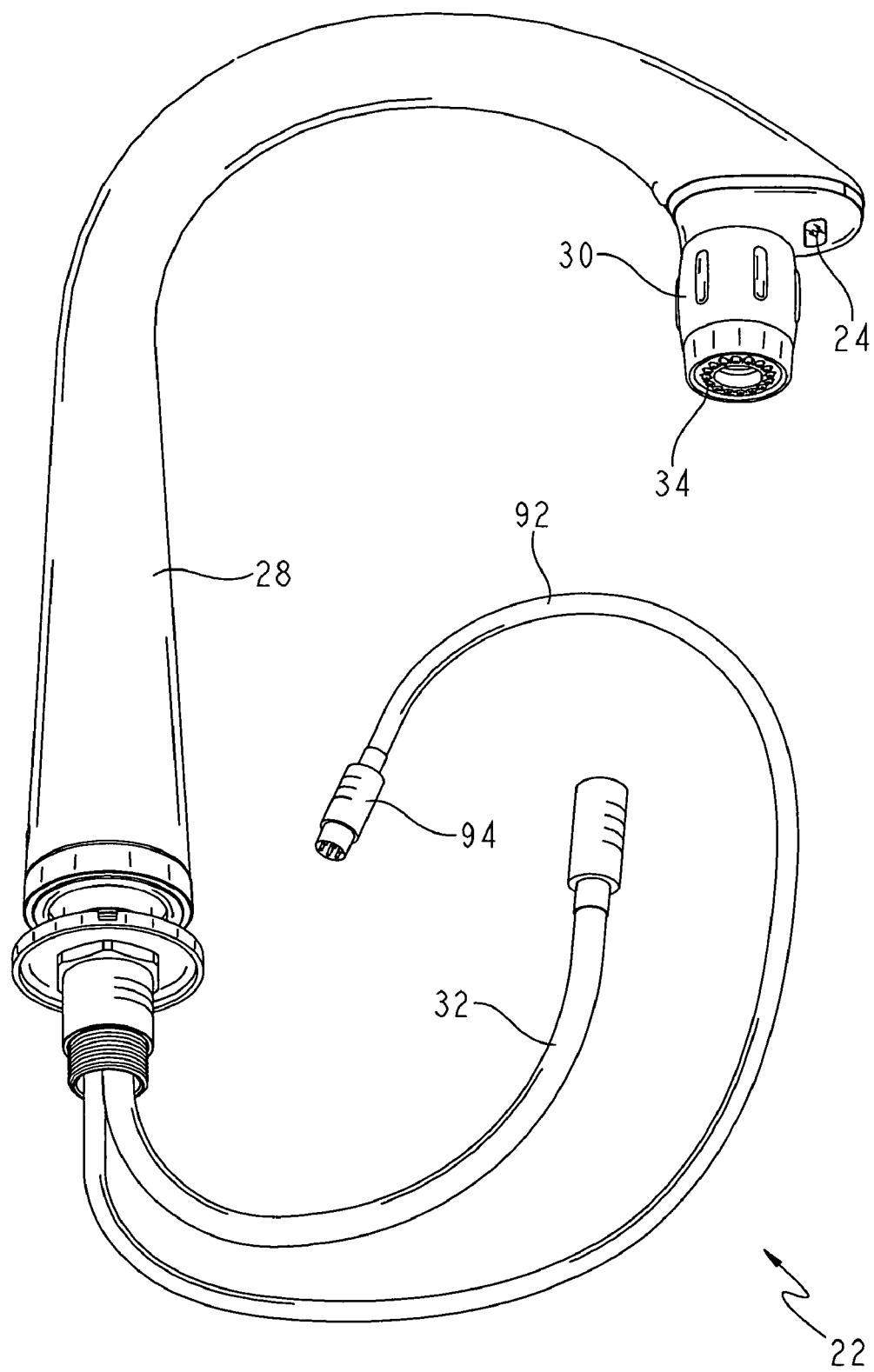
FIG. 6 is a perspective view of the spout of FIG. 1 including a cable for communication with the sensor.

The voltages and/or currents at terminals 72, 74 of detector 44 may be dependent upon where along a length 76 of detector 44 that the reflected IR energy is received. For example, the closer the location of the received IR energy to terminal 72, the higher the voltage/current that may be produced at terminal 72, and the lower the voltage/current that may be produced at terminal 74. The analog voltages/currents at terminals 72, 74 may be communicated to a signal processor 78 (FIG. 5) of sensor 24 via respective communication lines 80, 82. Based upon the signals on lines 80, 82, signal processor 78 may output a voltage signal on a line 84 to controller 26. The voltage signal on line 84 may be indicative of where along length 76 of detector 44 that the IR energy was received. Electrical power may be supplied to sensor 24 via a power line 86 (FIG. 1) and a ground line 88. Another line 90 may carry data from controller 26 for controlling sensor 24, and particularly controlling the output of emitter 38. Lines 84, 86, 88 and 90 may be carried in a common cable 92 (FIG. 6) having a connector 94 for connection to controller 26.

Figure 7:
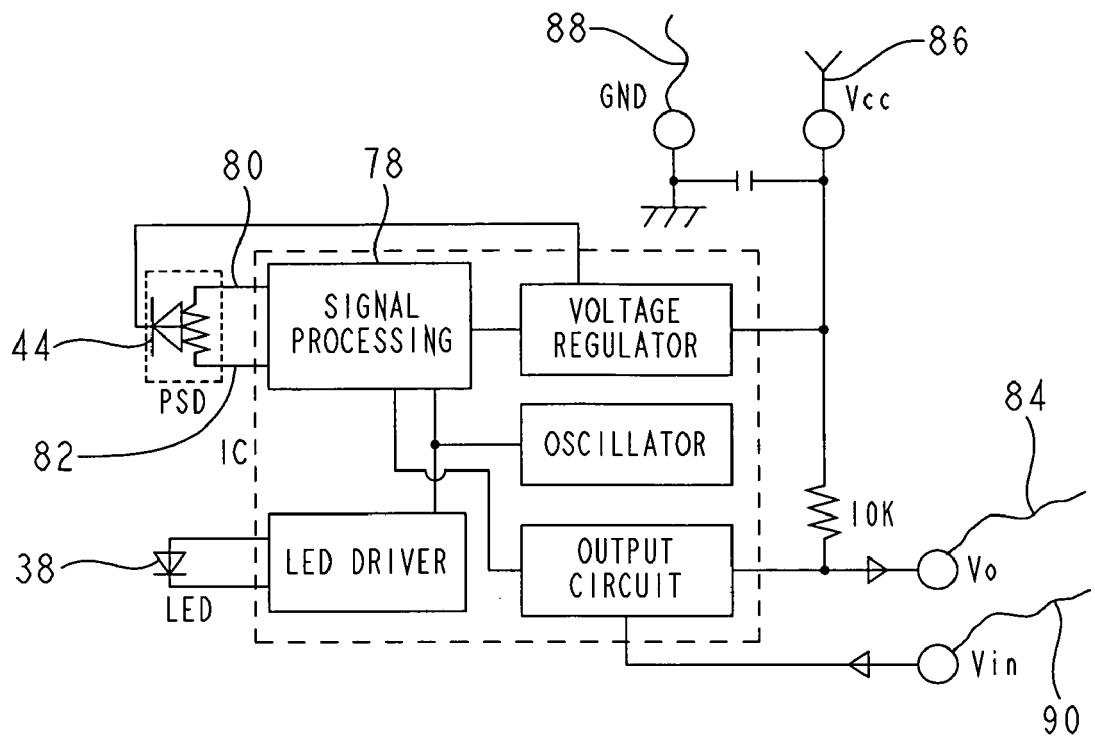
FIG. 7 is a schematic block diagram of the sensor of FIG. 1.
Figure 8:
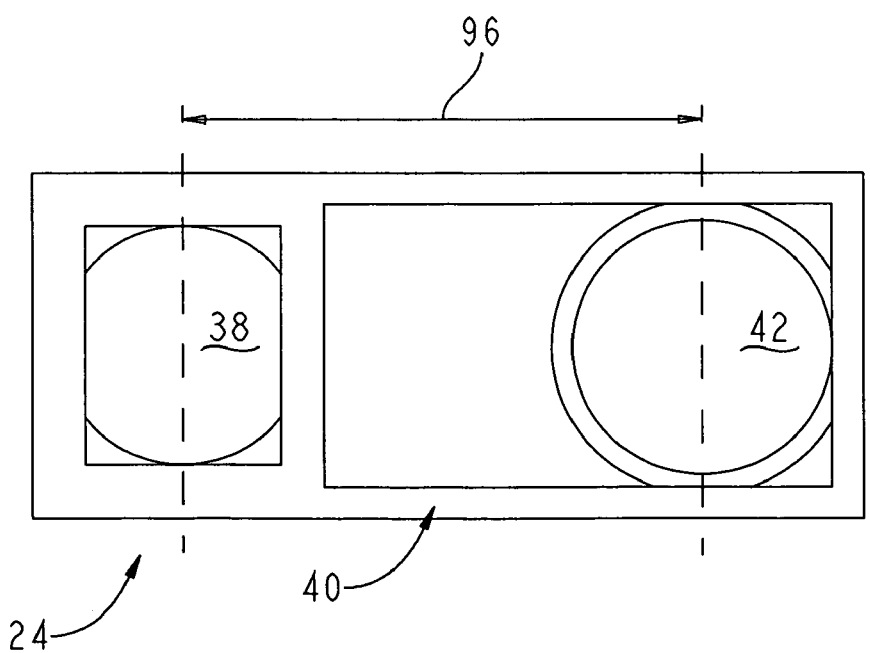
FIG. 8 is a plan view of the emitter and lens of the sensor of FIG. 7.

A more detailed schematic diagram of the electronics of one embodiment of sensor 24 is shown in FIG. 7. FIG. 8 is a diagram indicating the approximate sizes and shapes of emitter 38 and lens 42 in one embodiment of sensor 24. A distance 96 between the midpoints of emitter 38 and lens 42 may be approximately twelve millimeters. An example of a position-sensing detector that may be used as sensor 24 of the present invention is an eight bit output distance measuring sensor, model no. GP3Y0E001K0F, sold by Sharp Corporation. Sensor 24 may be connected to a circuit board (not shown) and to tube assembly 28 as disclosed in U.S. Provisional Patent Application Ser. No. 60/662,107, filed Mar. 14, 2005, titled "SPOUT ASSEMBLY FOR AN ELECTRONIC FAUCET AND METHOD FOR PROVIDING STRAIN RELIEF OF A CABLE", which is incorporated herein by reference.

Via a line 98 (FIG. 5), controller 26 may control a position of valve 100 based upon the voltage signal on line 84. The position of valve 100 may, in turn, control a flow of liquid through spout 22. Generally, the shorter the distance that controller 26 determines the IR energy traveled before being reflected, i.e., the shorter the distance between sensor 24 and the reflecting surface, the greater the likelihood that controller 26 will cause valve 100 to be in an open position in which liquid is delivered through spout 22. Thus, controller 26 may control a flow of liquid through spout 22 dependent upon an angle at which the diffused infrared energy is received by receiver 40.

Figure 9:
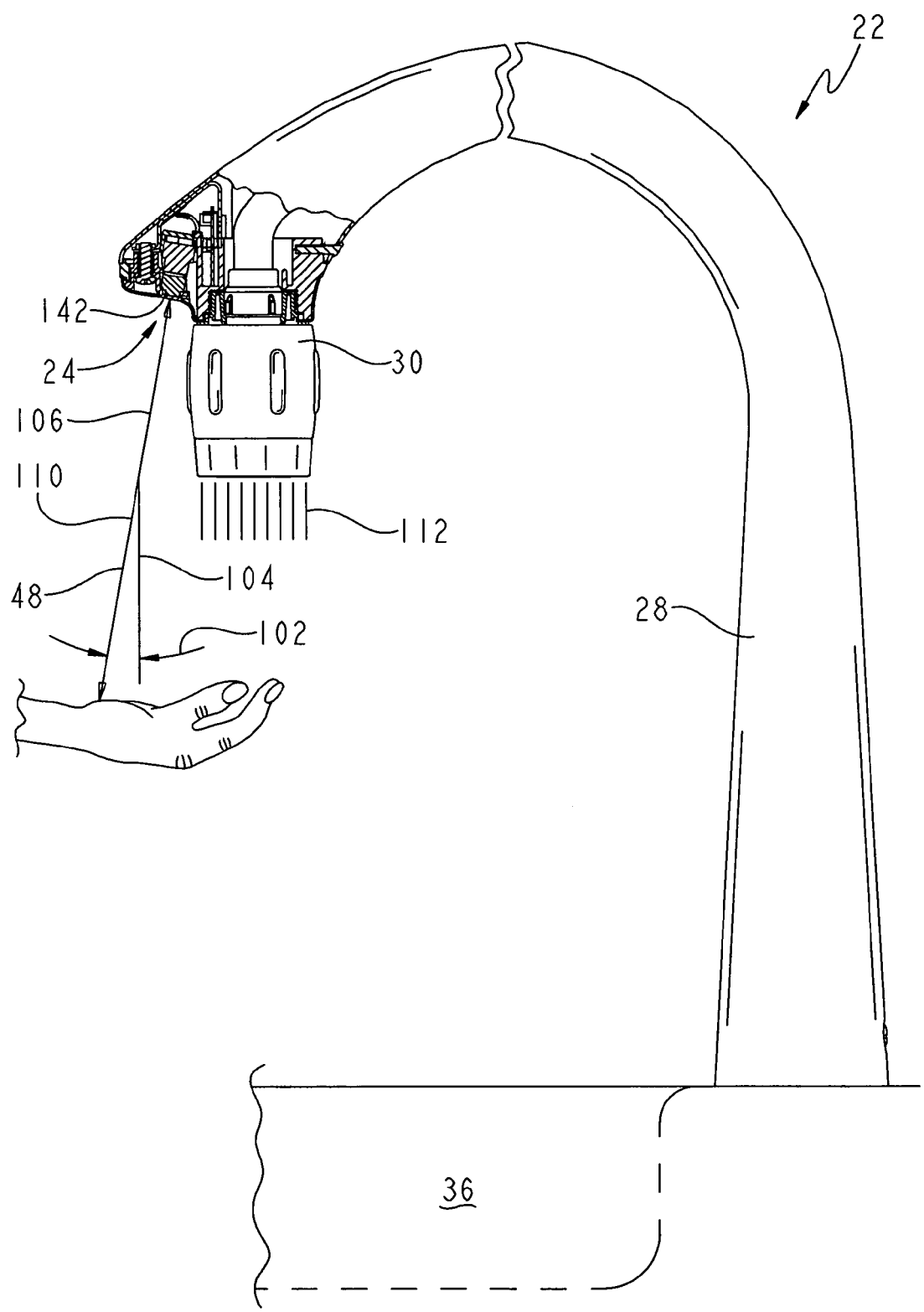
FIG. 9 is a side view of the spout of FIG. 1.
Figure 10:
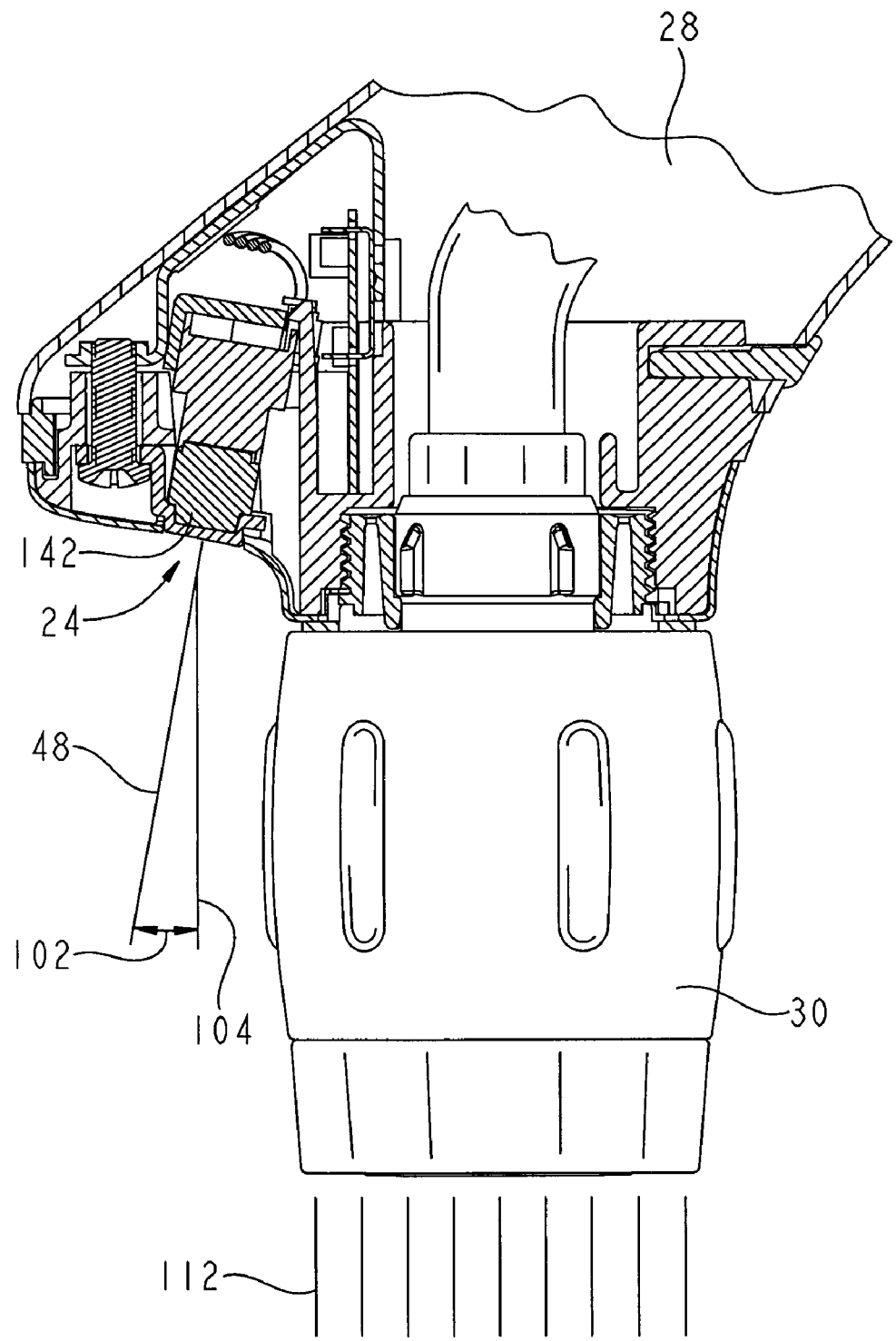
FIG. 10 is an enlarged side view of the spray head, sensor, and a portion of the tube assembly of the spout of FIG. 1.

According to the present invention, emitter 38 may be aligned such that, when spout 22 is installed above a sink bowl 36, the direction of emission of emitter 38, as represented by central axis 48, is oriented at an angle 102 (FIGS. 9 and 10) of approximately between five and fifteen degrees relative to a vertical direction 104. Vertical direction 104 may be defined as the direction aligned with the force of gravity. It has been found that directing emitter 38 at an angle 102 improves the stability over time of the signal transmitted on line 84 to controller 26. More particularly, directing emitter 38 at an angle 102 may reduce the amount of IR energy that is directed to receiver 40 via spectral reflection. For example, if central axis 48 of IR emission were oriented vertically, i.e., parallel to vertical direction 104, it may be more likely that IR energy would spectrally reflect off some surface and be received by receiver 40. Standing water in sink bowl 36 may be particularly apt to spectrally reflect IR energy back to receiver 40 because of the lensing properties of the standing water.

The spectrally reflected IR energy may be energy that is not emitted along axis 48, but rather is emitted within some other portion of the cone of IR emission, and thus may be emitted at the particular angle required to spectrally reflect to receiver 40. Spectrally reflection more efficiently reflects IR energy to a receiver than does diffuse reflection. Thus, even though the spectrally reflected IR energy is not emitted with intensity that is as high as the intensity with which the diffusely reflected IR energy along axis 48 is emitted, the spectrally reflected IR energy may be more efficiently reflected to receiver 40. Thus, the spectrally reflected IR energy may be received with an intensity that is high enough to significantly affect the output of detector 44. Because the spectrally reflected IR energy is received by receiver 40 at a different angle than is the diffusely reflected IR energy, the spectrally reflected IR energy may appear to the system to be diffusely reflected by a surface at a distance other than the actual distance of the reflecting surface. For this reason, spectrally reflected IR energy causes the output signal on line 84 to be unstable. By directing the IR energy at angle 102, a greater majority of the IR energy may be spectrally reflected away from receiver 40, thus reducing the total amount of spectrally reflected IR energy that is received by receiver 40.

In the embodiment shown in the drawings, angle 102 is oriented at approximately a right angle to a plane defined by axis 48 and paths 106a, 106b, 106c (FIG. 4) of diffuse reflection to receiver 40. That is, a first plane 108 (FIG. 1) defined by axis 48 and vertical direction 104, and a second plane 110 (FIG. 9) defined by axis 48 and any one of diffuse reflection paths 106a, 106b, 106c, are oriented approximately perpendicular to one another. However, the present invention is not limited to this ninety degree relationship between the two planes. Indeed, it is possible within the scope of the invention for the two planes to be oriented at any angle relative to one another.

Axis 48 is shown in the drawings as being directed generally away from a stream of liquid 112 from spray head 30. Stated more exactly, axis 48 does not intersect stream of liquid 112; and a plane defined by axis 48 and a vertical line extending through emitter 38 may approximately bisect stream of liquid 112. However, the present invention is not limited to this direction of axis 48. Excellent results may be obtained so long as axis 48 does not intersect stream 112. Emitter 38 may advantageously be directed such that axis 48 and stream 112 diverge from one another with increasing distance from emitter 38 and from spray head 30. Stream 112 may be directed by spray head 30 in a downward vertical direction.

Angle 102 has been described herein as being approximately between five and fifteen degrees. However, angle 102 may be any nonzero angle up to ninety degrees within the scope of the invention. In one embodiment, angle 102 is approximately between eight degrees and ten degrees. In the embodiment shown in FIG. 9, angle 102 is approximately ten degrees.

Lens 42 may be directed or focused in a direction that approximately intersects axis 48. Advantageously, lens 42 may be directed or focused in a direction that approximately intersects axis 48 at a point along axis 48 where a reflecting object is likely to be, such as near the top of sink bowl 36. With the direction or focus of lens 42 as described above, lens 42 may effectively focus the diffusely reflected IR energy onto detector 44. Sensor 24 may include a secondary outer lens 142, shown in FIGS. 9 and 10 and visible to a user of faucet arrangement 20, through which passes both outgoing IR energy from emitter 38 and incoming reflected IR energy to lens 42.

Sensor 24 may output the distance signal on line 84 at a plurality of points in time to thereby indicate the distance traveled by the IR energy before being reflected at each of the points in time. Thus, the distance signal on line 84 may be modified substantially continuously over time. In one embodiment, controller 26 may sample the distance signal twenty times per second, i.e., every fifty milliseconds.

Figure 11:
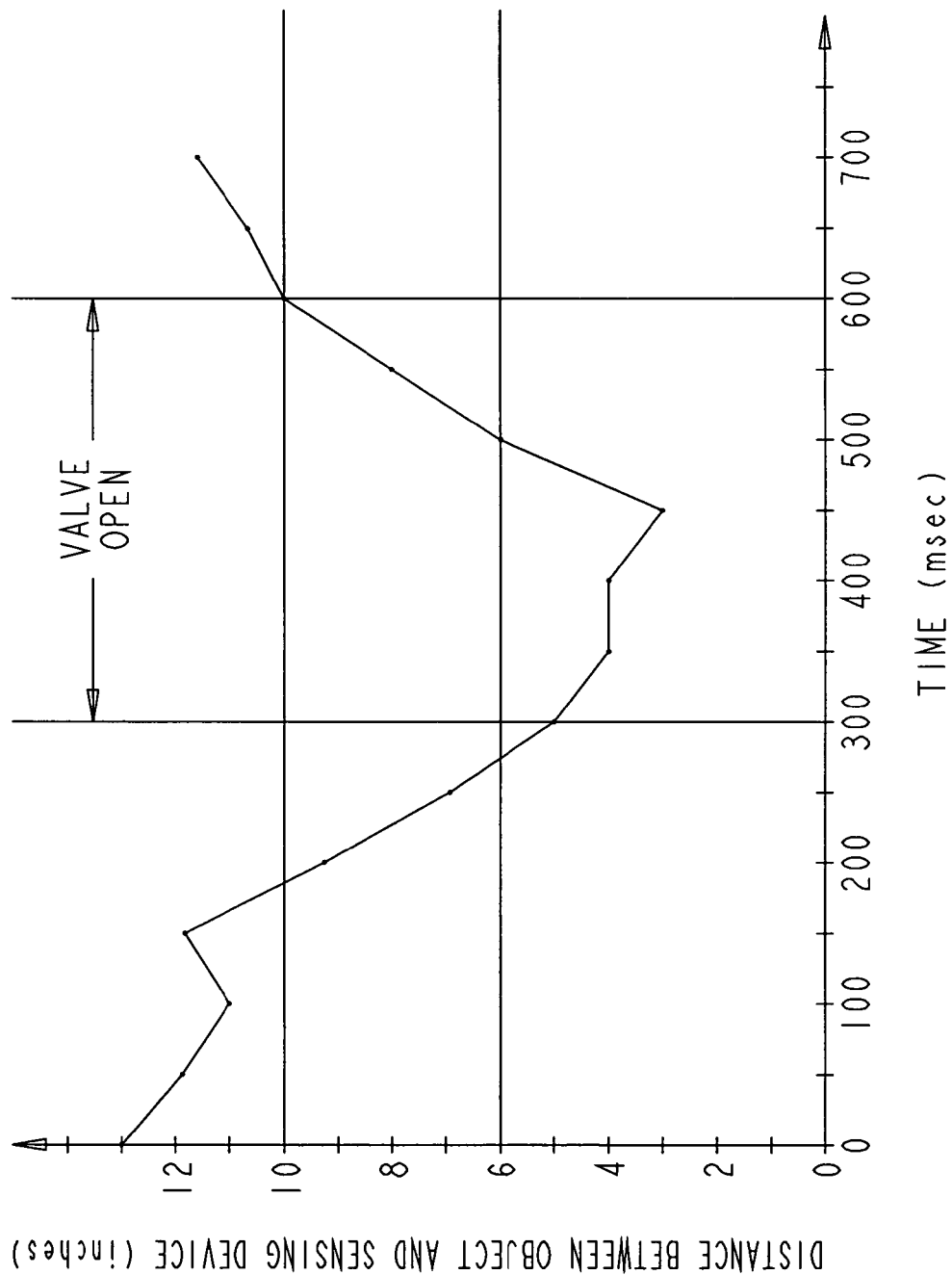
FIG. 11 is an exemplary plot of the distance signal versus time as produced by the sensor of FIG. 7.

Controller 26 may control the flow of liquid through spout 22 dependent upon whether the distance signal exceeds a threshold distance value. Controller 26 may cause water to flow through spout 22 if the distance traveled by the IR energy before reflection is less than, for example, six inches. FIG. 11 is an exemplary plot of the distance signal versus time. Controller 26 may cause valve 100 to open and thereby allow water to flow through spout 22 at time t=300 ms, when the distance signal first falls below six inches. Controller 26 may close valve 100 only when the distance signal equals or exceeds some other threshold value, such as ten inches in the example shown in FIG. 11. Thus, at t=600 ms, controller 26 may cause valve 100 to close. An exemplary control arrangement that may be used in conjunction with the present invention is disclosed in U.S. patent application Ser. No. 10/755,582, filed Jan. 12, 2004, and entitled "CONTROL ARRANGEMENT FOR AN AUTOMATIC RESIDENTIAL FAUCET", which is incorporated herein by reference. Other aspects of a control arrangement that may be used in conjunction with the present invention are disclosed in U.S. patent application Ser. No. 10/755,581, filed Jan. 12, 2004, and entitled "MULTI-MODE HANDS FREE AUTOMATIC FAUCET", and/or in other applications which are also incorporated herein by reference.

The values established by controller 26 for one or both of the threshold values may depend upon some environmental condition that is determined by controller 26. Examples of such environmental conditions include a level of stability of the distance signal over time, whether spout 22 has been recently touched by a user, a time duration of the touching of spout 22 by the user, and a time rate of change of the distance signal or of a moving average of the distance signal. In one embodiment, the activation threshold is updated whenever a spout grab is released; a tap off occurs; or a stable signal is received by sensor 24

Figure 12:
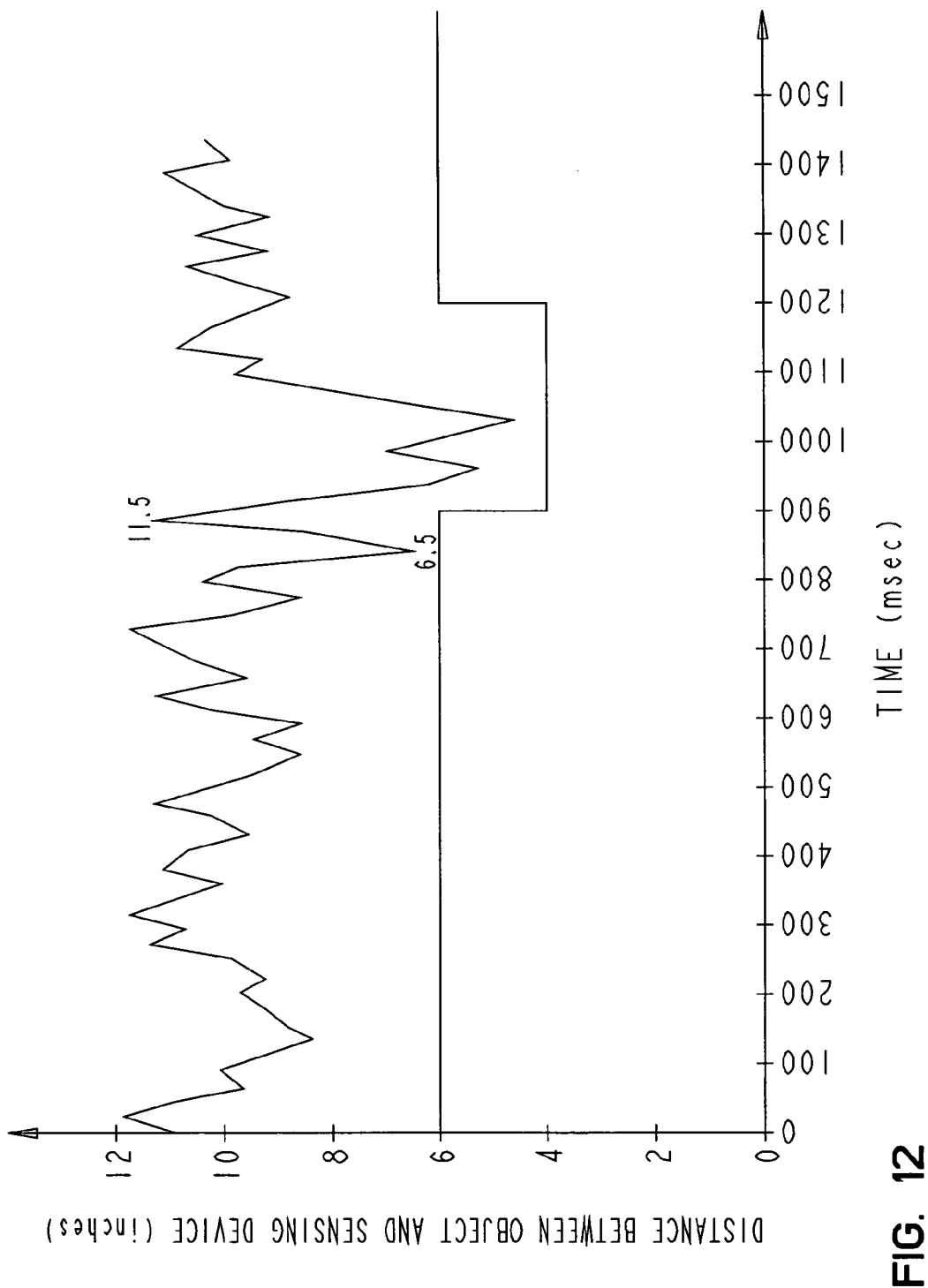
FIG. 12 is another exemplary plot of the distance signal versus time as produced by the sensor of FIG. 7.

The stability of the distance signal over time may be defined, in one embodiment, as a range of the distance signal within a preceding time period. In other embodiments, the stability of the distance signal over time may be defined as the standard deviation of the distance signal within a preceding time period, or as some other measure of stability. FIG. 12 is another exemplary plot of the distance signal versus time. A time t=0 ms, a threshold value under which the distance signal must drop before controller 26 opens valve 100 is set at six inches.

Controller 26 may set the threshold value based upon the stability of the distance signal. For example, controller 26 may monitor the stability of the distance signal, and if the range of the distance signal exceeds some value, such as 4.5 inches, within some time period, such as 100 ms, controller 26 may reduce the threshold value to four inches. Between 850 ms and 900 ms the distance signal increases from 6.5 inches to 11.5 inches, thus having a range of greater than four inches within a preceding 100 ms time period. Thus, at time t=900 ms, controller 26 reduces the threshold value from six inches to four inches. The distance signal may have become temporarily unstable due to spectral reflections being received by receiver 40, or due to some other reasons.

The threshold value may be reduced in order to prevent nuisance activations of valve 100 when the distance signal has become unstable, but there is no actual motion under spout 22 that warrants such activation. As shown in the plot between time t=900 ms and t=1100 ms, the distance signal does drop to values between four inches and six inches. Thus, the reduction of the threshold value to four inches prevents a nuisance activation of valve 100 in the time period between t=900 ms and t=1100 ms.

As the distance signal becomes more stable, controller 26 may increase the threshold value. For example, after t=1100 ms, the distance signal becomes relatively stable, varying by no more than approximately two inches within any 100 ms time period. After sensing this stability, controller 26 may raise the threshold value, such as to six inches at approximately time t=1200 ms as shown in FIG. 12.

Another environmental condition based upon which controller 26 may adjust the threshold value is whether spout 22 has been recently touched by a user. Faucet arrangement 20 may use capacitive sensing to determine whether spout 22 has been recently touched by a user. One possible implementation of such capacitive sensing is disclosed in U.S. patent application Ser. No. 10/757,316, filed Jan. 14, 2004, and entitled "CAPACITIVE TOUCH ON/OFF CONTROL FOR AN AUTOMATIC RESIDENTIAL FAUCET", which is incorporated herein by reference. If controller 26 determines that spout 22 has recently been touched by a user, within the preceding ten seconds, for example, controller 26 may increase the threshold value to which the distance signal is compared. For example, controller 26 may increase a threshold distance value from four inches to six inches such that controller 26 may open valve 100 if an object has been detected within six inches of sensor 24.

If the user has recently touched spout 22, then it may be deemed more likely that the user will desire that water be delivered from spray head 30. Thus, an increase in the threshold value may be appropriate in order to increase the likelihood that an object is sensed within the threshold distance value and thereby increase the likelihood that the water flow is turned on as desired by the user.

Yet another environmental condition based upon which controller 26 may adjust the threshold value is the time duration of the recent touching of spout 22 by the user. Again, capacitive sensing may be used to determine the time duration of the recent touching of spout 22 by the user. If controller 26 determines that spout 22 has recently been touched by a user with a time duration of at least one second, for example, controller 26 may increase the threshold value to which the distance signal is compared.

If the time duration of the touching is relatively short, then it may be assumed that the touching was inadvertent and that the touching is not probative of a user's desire that the water flow be turned on. If the user has recently touched spout 22 for a relatively long duration of time, then it may be deemed more likely that the user will desire that water be delivered from spray head 30. Thus, an increase in the threshold value may be appropriate in order to increase the likelihood that an object is sensed within the threshold distance value and thereby increase the likelihood that the water flow is turned on as desired by the user.

In one embodiment, controller 26 may filter the distance signal and compare this filtered distance signal to the threshold distance value in deciding whether to open valve 100. That is, controller 26 may control the flow of liquid through spout 22 dependent upon whether the filtered distance signal exceeds the threshold distance value. Again, the threshold distance value may be adjusted based upon environmental conditions.

In one embodiment, controller 26 filters the distance signal by calculating a moving average of a number of preceding values of the distance signal. However, it is also possible for the filtering to include calculating a weighted moving average, or some other type of average, of a number of preceding values of the distance signal.

In one embodiment, the filtering includes calculating a moving average of the four most recent values of the distance signal. In another embodiment, however, a number of values of the distance signal that are included in the moving average is dependent upon a level of stability of the distance signal. For example, if the distance signal is relatively unstable, which may be due to spectral reflections being received by the sensor, then it may be desirable to include a greater number of the preceding values of the distance signal in the calculated moving average so that the calculated moving average is more representative of a true average. Conversely, if the distance signal is relatively stable, then fewer values of the distance signal may be needed to calculate a moving average that is representative of a true average.

In one embodiment, eight preceding values of the distance signal may be included in the calculated moving average when the distance signal is relatively unstable, and only four preceding values of the distance signal may be included in the calculated moving average when the distance signal is relatively stable. It may be advantageous to include fewer values in the moving average, when possible, so that controller 26 may react more quickly to the insertion and/or removal of objects under spout 22. That is, the fewer values included in the moving average, the greater the influence of a most recent value on the moving average, and the more quickly the moving average will change due to an object moving under spout 22.

Figure 13:
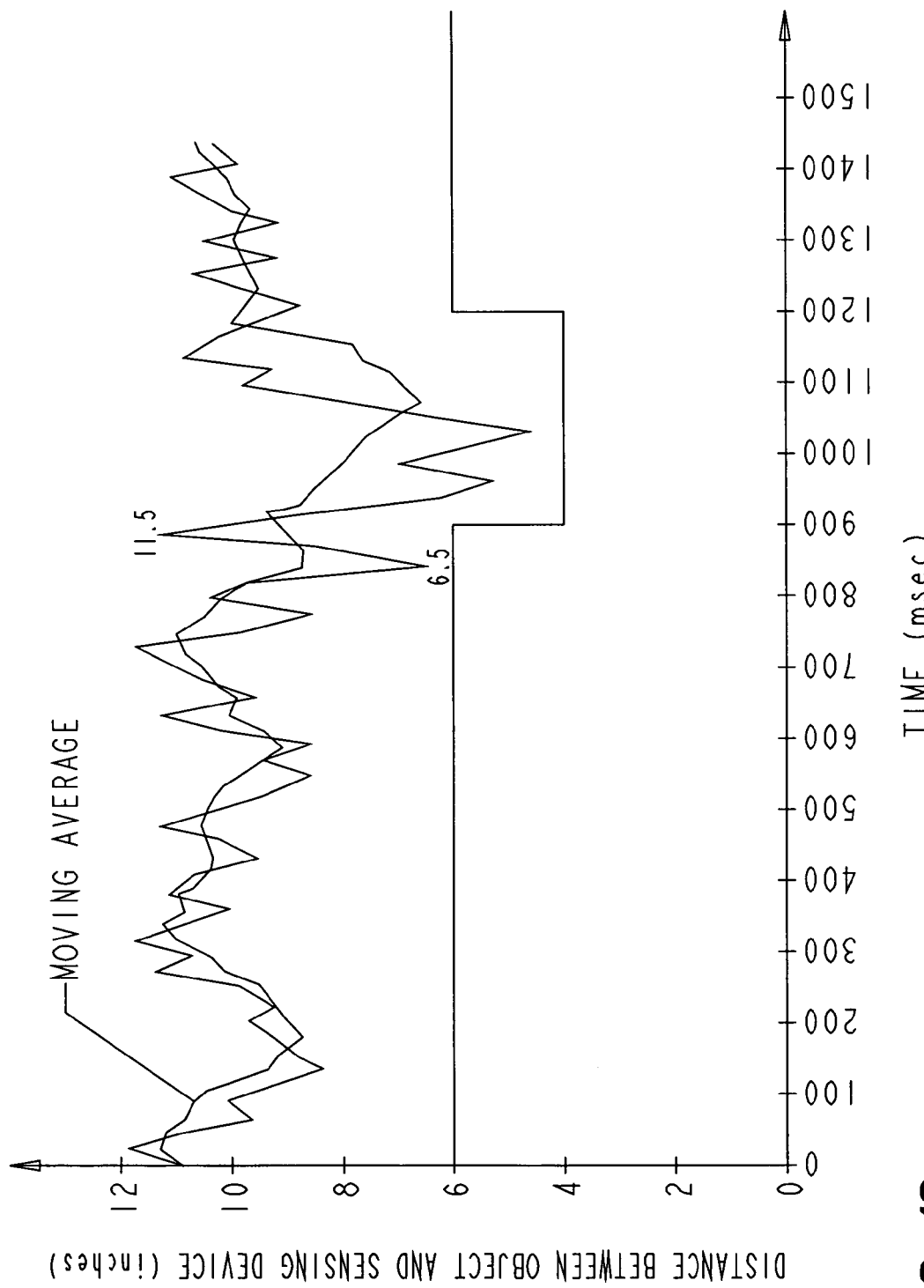
FIG. 13 is the exemplary distance signal plot of FIG. 12 along with a plot of a moving average of the distance signal.

FIG. 13 illustrates the exemplary distance signal and threshold value of FIG. 12 along with a calculated moving average of the distance signal. When the distance signal is deemed to be relatively stable, as time periods t=0 to t=900 ms and t=1200 ms to 1500 ms, only the four most recent points are included in the moving average. However, when the distance signal is deemed to be relatively unstable, as time period t=900 ms to t=1200 ms, the eight most recent points are included in the moving average. As is evident from the greater differential in time period t=900 ms to t=1100 ms between the moving average and the threshold value as compared to the differential between the raw distance signal and the threshold value, the use of a moving average may prevent noise in the distance signal from causing nuisance activations of spout 22.

In another embodiment, eight preceding values of the distance signal may be included in the calculated moving average not only when the distance signal is relatively unstable, but also whenever liquid is flowing from spout 22. Flowing water in the field of view of the sensor may cause spectral reflections, which may call for increased filtering. The greater number of values included in the moving average may provide such increased filtering. In this embodiment, only four preceding values of the distance signal may be included in the calculated moving average when the distance signal is relatively stable and when liquid is not flowing from spout 22.

Although the filtering has been disclosed herein as calculating a moving average, other types of filtering are possible within the scope of the present invention. For example, the filtering may include some other form of low pass filtering, such as finding a median value, or calculating a moving average after eliminating the highest value and the lowest value.

Figure 14:
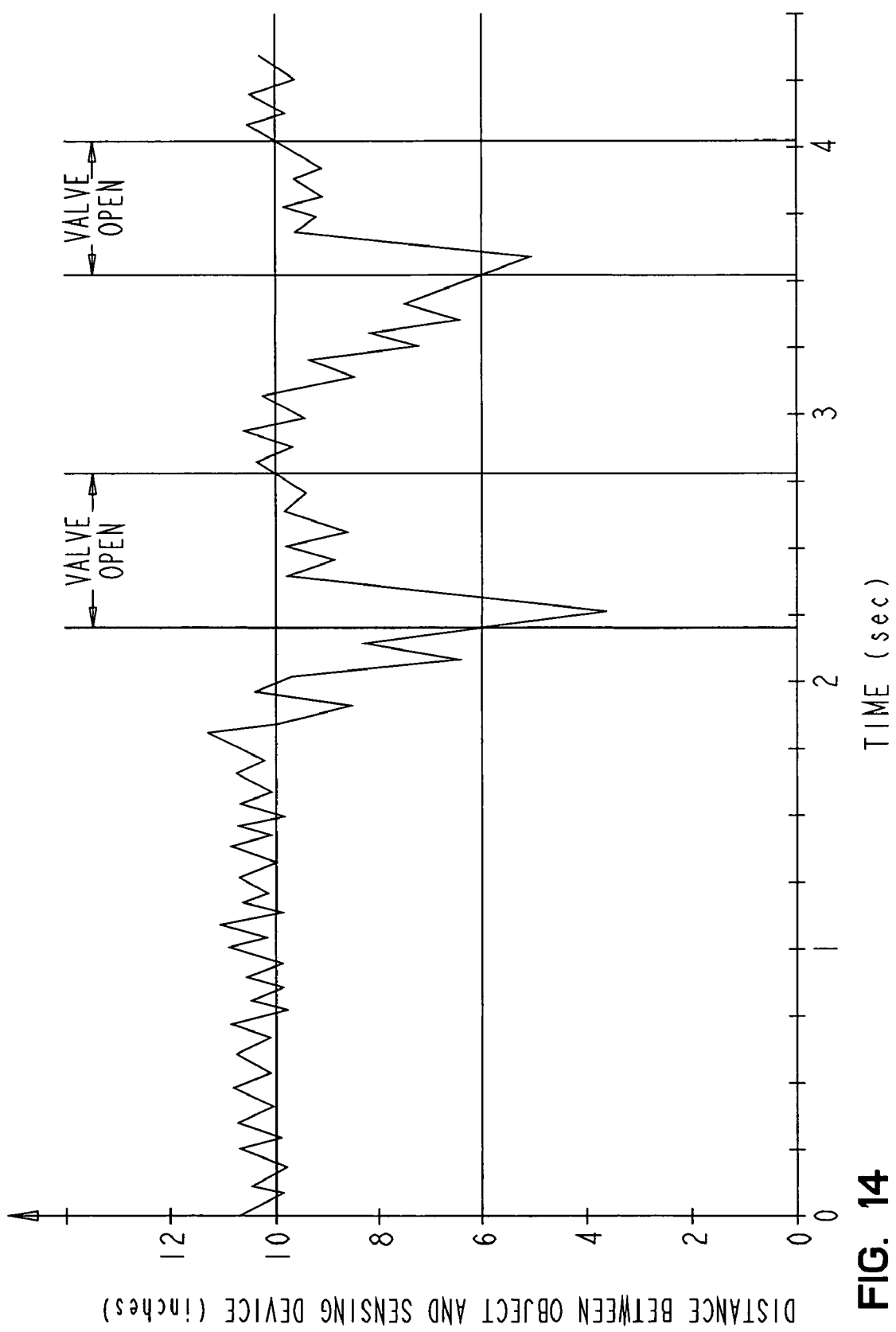
FIG. 14 is another exemplary plot of a moving average of the distance signal versus time as produced by the sensor of FIG. 7.

A tendency of the output of PSD sensors to rather suddenly begin drifting has been observed, and is illustrated in FIG. 14. The moving average of the output signal is shown to be stable up to approximately time=1.75 seconds. At that time, the distance reading of the sensor starts to drop abruptly toward the turn on threshold of six inches despite there being no actual movement in the basin. As shown, the distance reading crosses the turn on threshold at approximately time=2.23 seconds, which causes the valve to open and water to flow from the spout. The flow of water may cause the output of the sensor to stabilize and cross the turn off threshold of ten inches, as shown at approximately time=2.8 seconds. After the valve closes and the water flow ceases, the output of the sensor may again drift, as shown starting at approximately time=3 seconds. The cycle of unwanted water flow repeats, with the valve again opening at approximately time=3.57 seconds.

Still another environmental condition based upon which controller 26 may adjust the threshold value is the downward slope, or time rate of change, of the distance signal or of a moving average of the distance signal. In one embodiment of the invention, illustrated in FIG. 15, drifting of the moving average of the sensor output is sensed, and the turn on threshold is accordingly adjusted such that undesired water flows are avoided. More particularly, if the downward slope, or time rate of change, of the sensor output is within a predetermined range that is typically associated with sensor drift, then the turn on threshold may be adjusted downward in order to avoid nuisance water flows from the spout. For example, at approximately time=2.1 seconds, the output signal exhibits a downward slope that is within the predetermined range. In response, the turn on threshold is lowered from about six inches to about 2.8 inches.

If the magnitude of the slope is greater than the predetermined range, then it may indicate that the change in the output is due to some other phenomenon, such as spectral reflection, and thus the turn on threshold is not adjusted. If the magnitude of the slope is less than the predetermined range, then it may indicate that the change in the output is due to some actual movement within the basin, and the turn on threshold is again not adjusted.

Figure 15:
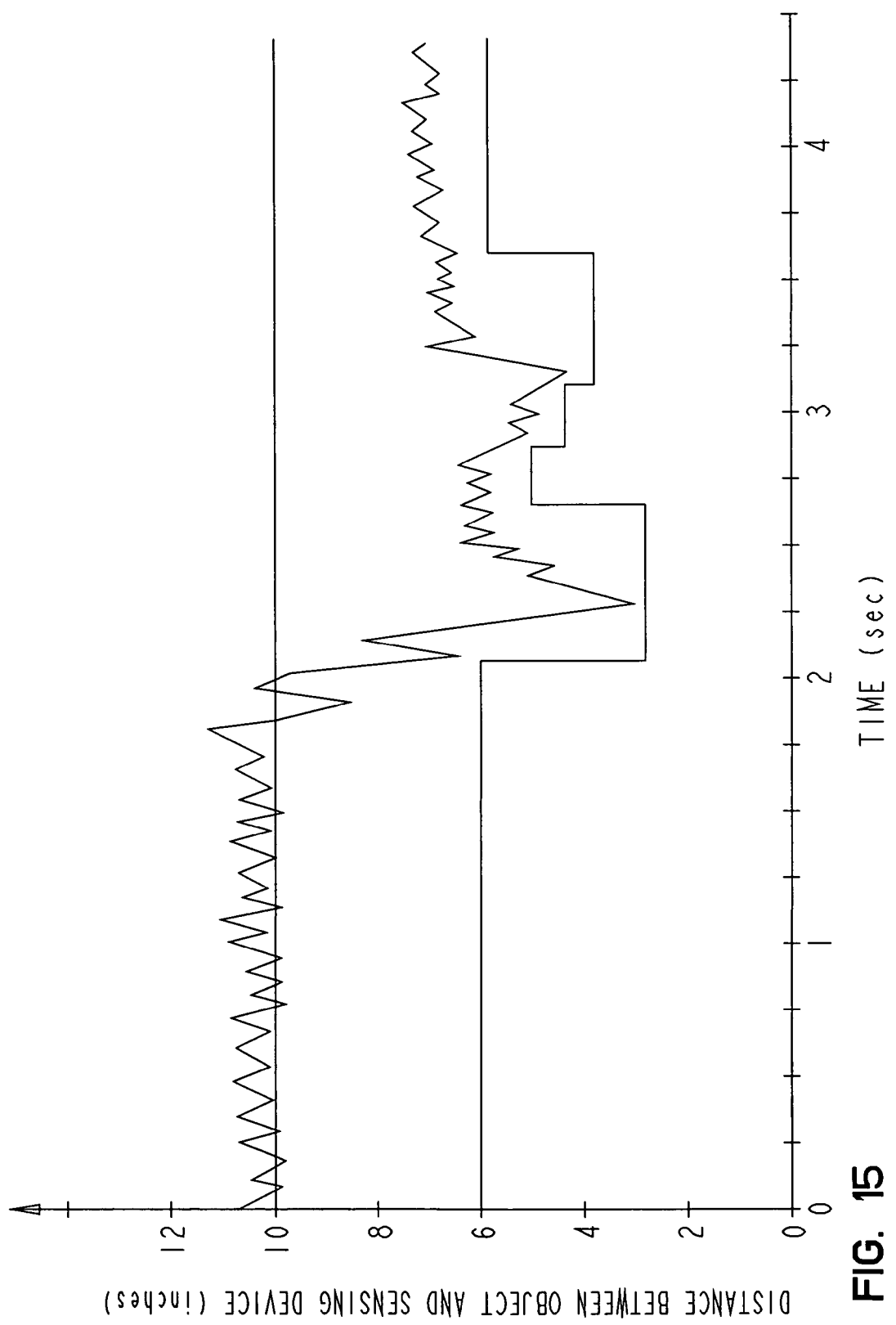
FIG. 15 is an exemplary plot of a moving average of the distance signal resulting from implementation of an algorithm of the present invention for setting an ON threshold.

After the output of the sensor has stabilized, as shown in FIG. 15 in the time period approximately between 2.5 seconds and 2.75 seconds, the turn on threshold may be adjusted upward. For example, in FIG. 15, the turn on threshold is shown as being adjusted to a level of approximately five inches at approximately time=2.7 seconds. As the output signal continues to alternate between drifting downward and restabilizing, the threshold may be accordingly readjusted, as shown in the time period after approximately time=2.9 seconds.

Figure 16:
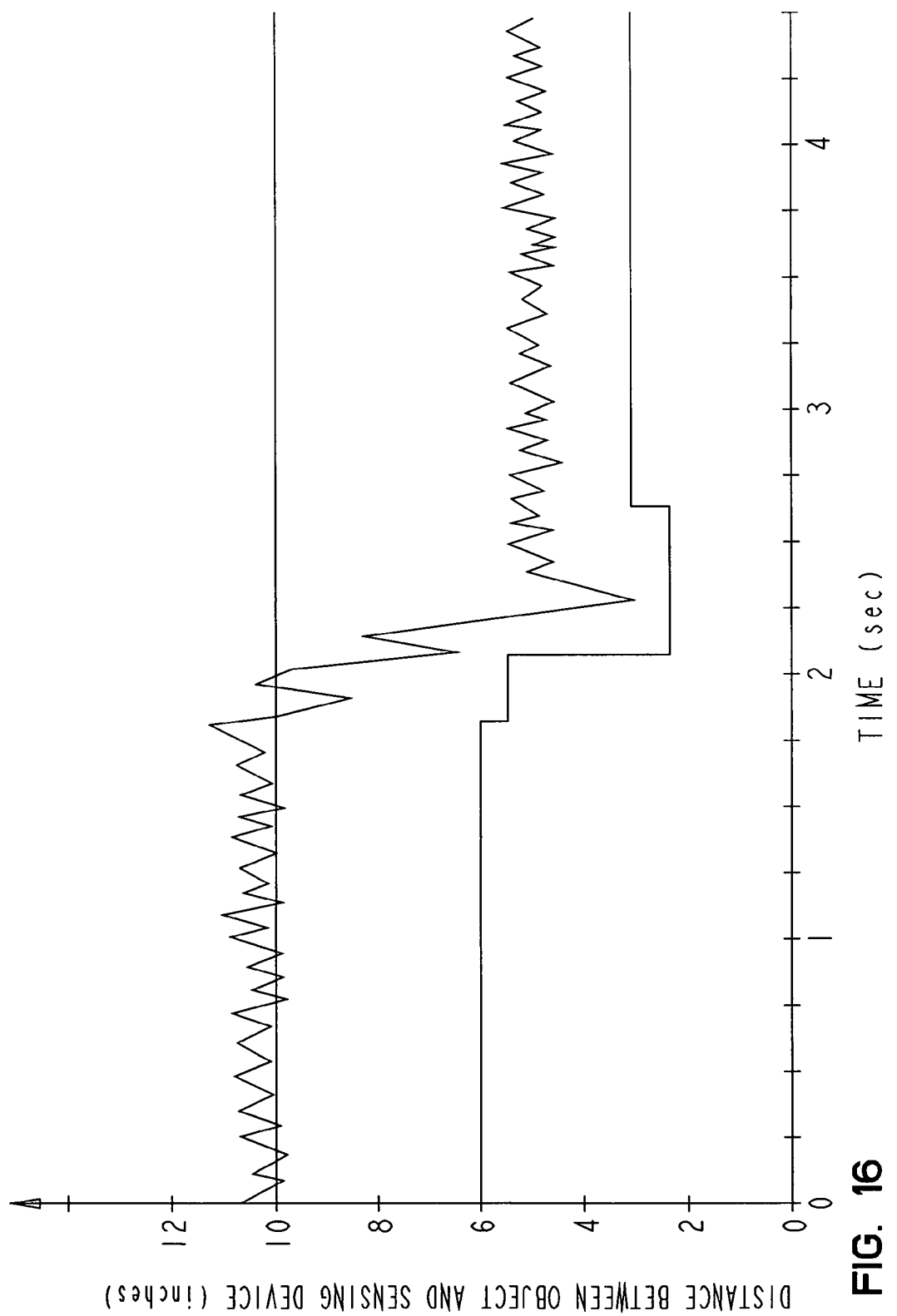
FIG. 16 is another exemplary plot, similar to FIG. 15, but with a modified algorithm for setting the ON threshold.

FIG. 16 is another exemplary plot of a drifting sensor output signal moving average and a slightly different algorithm for adjusting the turn on threshold. In this embodiment, the turn on threshold is adjusted with the intent of maintaining some minimum difference between the output signal and the turn on threshold. Thus, at approximately time=1.85 seconds, the turn on threshold may be lowered in order to maintain a predetermined gap between the output signal and the turn on threshold. In FIG. 16 the output signal stabilizes at a value of approximately equal to five inches for some reason that is unrelated to the algorithm for setting the turn on threshold. However, the stabilization accommodates a clear illustration of the gap of approximately between 1.5 and 2.0 inches that the algorithm maintains between the turn on threshold and the stabilized sensor output in the time period after approximately 2.75 seconds.

As illustrated in the embodiments of FIGS. 15-16, the turn on threshold may be adjusted based not only on the downward slope of the sensor output signal or its moving average, but also on a value of the output signal or its moving average. More particularly, the threshold distance value may be maintained to be at least a predetermined amount greater than a value associated with the distance signal if the rate of change associated with the distance signal is within a predetermined range.

IR energy receiver 40 has been described herein as being analog. However, it is to be understood that it is within the scope of the present invention for the IR energy receiver to be of the digital variety. Such a digital receiver is capable of pixelating the regions of IR reception. That is, the digital receiver may provide data relating to the intensity and location of IR reception on a pixel-by-pixel basis. Thus, a digital receiver may provide more information than does an analog receiver.

While this invention has been described as having an exemplary design, the present invention may be further modified within the spirit and scope of this disclosure. This application is therefore intended to cover any variations, uses, or adaptations of the invention using its general principles.

What is claimed is:

1. A faucet arrangement, comprising:
a spout;
an infrared sensing device configured to:
emit infrared energy;
receive the infrared energy after the energy has been reflected; and
produce a distance signal indicative of a distance traveled by the infrared energy before being reflected; and
a control device in communication with said sensing device and configured to control a flow of liquid through said spout dependent upon whether the distance signal exceeds a threshold distance value, the threshold distance value being adjusted over time based upon distance signal stability.

2. The arrangement of claim 1 wherein distance signal is produced at a plurality of points in time to thereby indicate the distance at each of the points in time, the distance signal stability comprises a level of stability of the distance signal over time.

3. The arrangement of claim 2 wherein the level of stability comprises a range of the distance signal within a preceding time period.

4. The arrangement of claim 2 wherein said control device is configured to filter the distance signal, and to control the flow of liquid through said spout dependent upon whether the filtered distance signal exceeds the threshold distance value.

5. The arrangement of claim 1 wherein said sensing device comprises a position-sensing detector.

6. The arrangement of claim 1 wherein said sensing device is configured to be installed such that a direction of emission of the infrared energy is oriented an angle of approximately between 5 and 15 degrees relative to a vertical direction.

7. The arrangement of claim 1 wherein the threshold distance value is maintained to be at least a predetermined amount greater than a value associated with the distance signal if the rate of change associated with the distance signal is within a predetermined range.

8. A faucet arrangement, comprising:
a spout;
an infrared sensing device configured to:
emit infrared energy;
receive the infrared energy after the energy has been reflected; and
produce a distance signal indicative of a distance traveled by the infrared energy before being reflected, the distance signal being produced at a plurality of points in time to thereby indicate the distance at each of the points in time; and
a control device in communication with said sensing device and configured to:
filter the distance signal over time based upon at least one environmental condition; and
control a flow of liquid through said spout dependent upon whether the filtered distance signal exceeds a threshold distance value, the threshold distance value being adjusted over time based upon at least one environmental condition.

9. The arrangement of claim 8 wherein the environmental condition comprises a level of stability of the distance signal over time.

10. The arrangement of claim 9 wherein the level of stability comprises a range of the distance signal within a preceding time period.

11. The arrangement of claim 8 wherein the environmental condition comprises whether said spout has been touched by a user.

12. The arrangement of claim 11 wherein the environmental condition comprises a time duration of the touching of said spout by the user.

13. The arrangement of claim 8 wherein said sensing device comprises a position-sensing detector.

14. The arrangement of claim 8 wherein said sensing device is configured to be installed such that a direction of emission of the infrared energy is oriented an angle of approximately between 5 and 15 degrees relative to a vertical direction.

15. The arrangement of claim 8 wherein the filtering of the distance signal includes calculating a moving average of a plurality of preceding values of the distance signal, a number of the preceding values included in the moving average being dependent upon a level of stability of the distance signal over time.

16. A faucet arrangement, comprising:
a spout;
an infrared sensing device including:
an infrared energy emitter, and
an infrared energy receiver configured to receive reflected infrared energy from the emitter, wherein a distance signal is produced indicative of a distance traveled by the infrared energy before being reflected;
a control device in communication with the sensing device and configured to control a flow of liquid through the spout dependent upon whether the distance signal exceeds a threshold distance value, the threshold distance value being adjusted over time based upon an environmental condition; and
wherein the environmental condition includes at least one of:
a level of stability of the distance signal over time;
whether the spout has been touched by a user; and
a rate of change associated with the distance signal.

17. The arrangement of claim 16 wherein the level of stability comprises a range of the distance signal within a preceding time period.

18. The arrangement of claim 16 wherein the control device is configured to filter the distance signal, and to control the flow of liquid through the spout dependent upon whether the filtered distance signal exceeds the threshold distance value.

19. The arrangement of claim 16 wherein the environmental condition includes a time duration of the touching of the spout by the user.

20. The arrangement of claim 16 wherein the sensing device comprises a position-sensing detector.

21. The arrangement of claim 16 wherein the sensing device is configured to be installed such that a direction of emission of the infrared energy is oriented an angle of approximately between 5 and 15 degrees relative to a vertical direction.

22. The arrangement of claim 16 wherein the threshold distance value is maintained to be at least a predetermined amount greater than a value associated with the distance signal if the rate of change associated with the distance signal is within a predetermined range.

* * * * *